Jan. 29, 1929.　　　　　　　　　　　　　　　　1,700,127
A. W. HAISS
TRACTOR
Filed Sept. 28, 1925

INVENTOR
Alfred W. Haiss
BY
Williams & Morse
ATTORNEYS.

Patented Jan. 29, 1929.

1,700,127

UNITED STATES PATENT OFFICE.

ALFRED W. HAISS, OF NEW YORK, N. Y., ASSIGNOR TO GEORGE HAISS MANUFACTURING CO. INC., OF NEW YORK, N. Y., A CORPORATION OF NEW YORK.

TRACTOR.

Application filed September 28, 1925. Serial No. 59,019.

This invention relates to tractors and is herein shown embodied in a tractor of the endless track type comprising a motor, a traction mechanism, and a power transmitting mechanism which includes a differential gearing and driving sprockets adapted to cooperate with driven sprockets carried by the driving shaft of the traction mechanism.

An important object of my invention is to provide a simple, reliable and effective means for so mounting the tractor motor and power transmitting mechanism with respect to the traction mechanism as to maintain a proper relationship between the power transmitting mechanism and the traction mechanism and at the same time permit a relative movement between the motor and traction mechanism whereby the motor and power transmitting mechanism are relieved of undue shocks during operation of the tractor.

Other objects and advantages of the invention will become apparent from the following description when taken in connection with the accompanying drawings in which—

Figure 1:
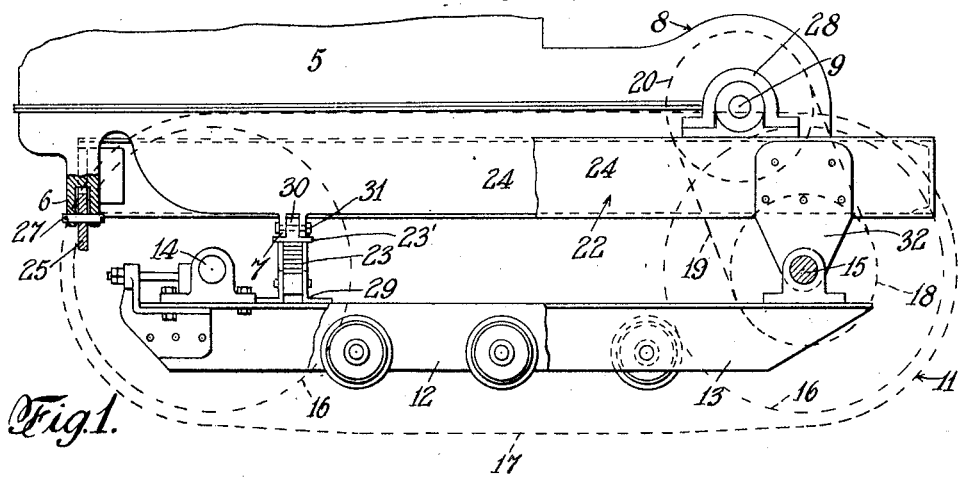
Figure 1 is a fragmentary view partly in section and partly in elevation of a tractor embodying my invention.
Figure 2:
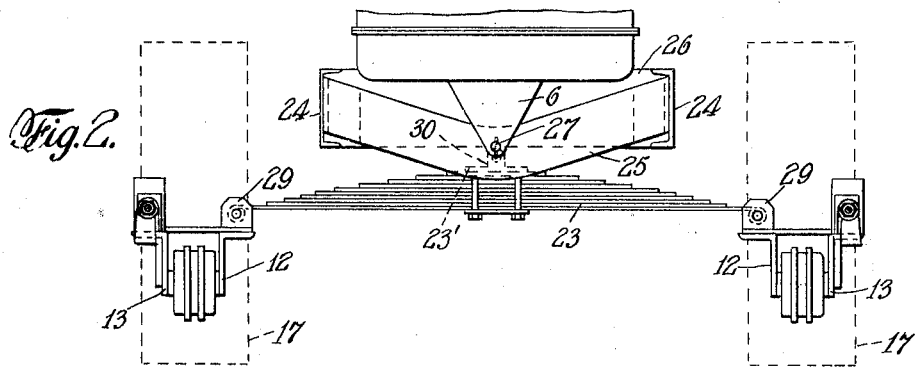
Figure 2 is an end elevation of the tractor as viewed from the left in Figure 1.
Figure 3:
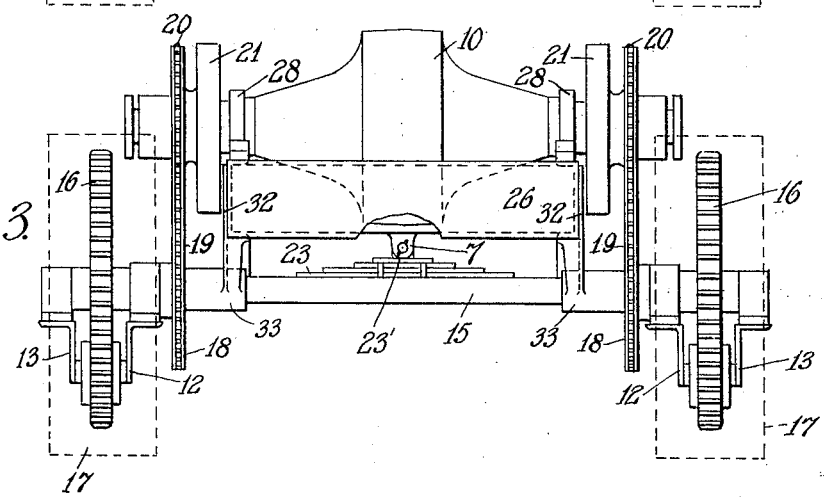
Figure 3 is an end elevation of the tractor as viewed from the right in Figure 1.

Referring to the drawings, the numeral 5 indicates a motor such as an internal combustion engine, the crank case or housing of which is provided with pairs of depending lugs 6 and 7. With the motor 5 is associated a power transmission mechanism indicated by the numeral 8 and comprising a pair of stub shafts 9 which are adapted to be connected to the motor 5 through a suitable differential 10 and a suitable change speed transmission, not shown.

The structure thus far described constitutes the power plant of the well known Fordson tractor, which power plant I have utilized in the tractor embodying my invention. The traction mechanism 11 comprises a frame made up of inner and outer side members 12 and 13, respectively, to which are journaled shafts 14 and 15, carrying sprockets 16 over which pass a pair of flexible traction elements shown in dotted lines and indicated by the numerals 17. The shaft 15 is provided with a pair of driven sprockets 18 operatively connected to the sprockets 16 and adapted to be connected, by means of sprocket chains 19, to a pair of driving sprockets 20 secured to the stub shafts 9. The driving sprockets 20 and a pair of suitable brakes 21 are substituted for the usual Fordson traction wheels, the brakes 21 being adapted to be controlled through suitable mechanism, not shown, for steering the tractor in a manner well known in connection with tractors of the endless track type.

The power plant comprising the motor 5 and transmission 8 is supported in part by means of a frame 22 and in part by means of a spring 23, the frame and spring being suitably connected with the power plant and to the traction mechanism. The frame 22 comprises side members 24 and cross members 25 and 26, the former of which is secured intermediate the lugs 6 by means of a bolt 27 or the like. The frame 22 is further attached to the power plant by means of U-shaped straps or castings 28 which are yoked over opposite ends of the differential housing and are suitably secured to the side members 24.

The spring 23 is arranged transversely of the tractor and is at each end pivotally connected to a pair of upstanding lugs 29 which are secured to the inner side members 12 of the traction mechanism 11. To the spring 23, intermediate its ends, is strapped or otherwise suitably secured an anchor plate 23' carrying a lug or projection 30 which projects into the space afforded between the lugs 7. The lug 30 is pivotally connected to the lugs 7 by means of a bolt 31 or the like.

By reason of the resilient connection afforded between the motor 5 and the traction mechanism 11, it is obvious that a slight relative movement of the power plant is permitted with respect to the traction mechanism when the tractor is operating upon a rough or irregular roadway, with the result that the power plant is relieved of such shocks as it might otherwise be forced to undergo.

Since the spring 23 at the front of the tractor permits a relative movement between the power plant and the traction mechanism and inasmuch as a driving connection is maintained between the shafts 9 and the sprockets 18, it becomes necessary to provide such a connection between the frame 22 and the traction mechanism 11 at the rear of the tractor as will permit the shaft 9 to oscillate about the shaft 15 as a center regardless of whether the shafts 9 are operatively connected with the traction mechanism 11 through the instrumentality of sprockets and sprocket chains, as shown, or through the instrumentality of intermeshing gears, not shown. In order to permit the desired oscillatory movement of the shafts 9 about the shaft 15 the frame 22 is connected to the traction mechanism 11 by means of bearing plates 32. These bearing plates are suitably connected to the side members 24 and are provided at their lower ends with elongated bearings 33 within which the shaft 15 is journaled.

From the foregoing it is obvious that the frame 22 of the power plant, including the motor 5 and power transmission mechanism 8, is adapted to yield with respect to the traction mechanism 11 by reason of the resilient connection afforded between the power plant and traction mechanism by the spring 23. It is also apparent that such yielding in no way effects or interferes with the driving connection afforded between the shafts 9 and the traction mechanism 11 since the distance between the shafts 9 and the shaft 15 is always the same due to the fact that the frame 22 is so connected to the traction mechanism 11 that the shafts 9 are permitted to oscillate about the shafts 15 as a center.

Having thus described my invention what is claimed is:

In combination, a tractor power plant including a motor and a power transmission mechanism; a traction mechanism of the endless-track type, including a traction frame having side members, sprockets provided at each end thereof, and endless tracks carried thereby; a body frame substantially longer than said traction frame and projecting beyond both ends of said traction frame and having side members rigidly secured near its rear end to the rear end of said power plant and pivotally connected near the same end to said traction mechanism, the extreme forward end of the body frame being connected to the forward end of the said power plant and being free with respect to said traction mechanism; and a transverse spring pivotally connected to said side members of said traction frame at a substantial distance inside the sprockets at that end, and pivotally connected at its middle to said body frame and power plant at a point a substantial distance behind the forward ends thereof, whereby said power plant and the body frame are adapted to oscillate about the point of connection of the body frame with said traction mechanism, and distortion of the forward end of the traction frame is permitted without subjecting said power plant and the body frame to similar distortion.

In testimony whereof, I have affixed my signature to this specification.

ALFRED W. HAISS.